June 27, 1967 M. BAKER 3,327,406
EDUCATIONAL DEVICE
Filed May 21, 1965
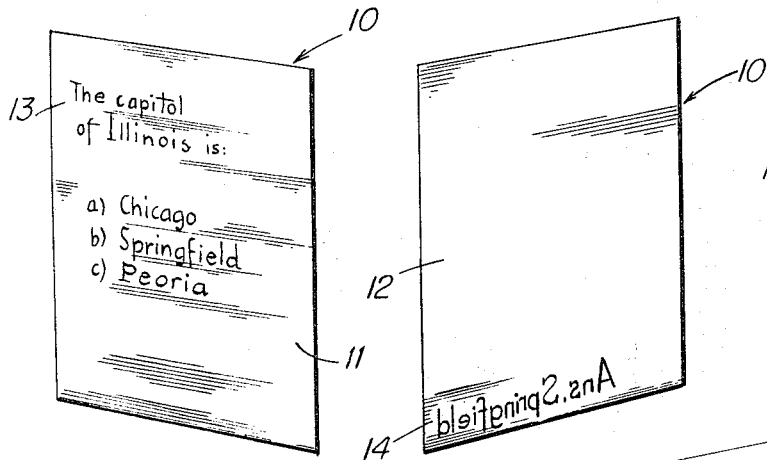
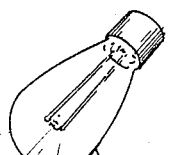

United States Patent Office 3,327,406
Patented June 27, 1967

3,327,406
EDUCATIONAL DEVICE
Melvin Baker, 4017 Ave. J, Brooklyn, N.Y. 11210
Filed May 21, 1965, Ser. No. 457,628
2 Claims. (Cl. 35—9)

The present invention is primary concerned with an educational device. It may also be used as a game or an amusement device.

When employing teaching or educational devices, it is helpful and important that the device is one which stimulates the mind of the student and provides the proper motivation for continued learning. This may be accomplished by posing a question which requires an answer and then giving the student an opportunity to answer the question without any assistance. Thereafter, the correct answer to the question is furnished to the student. This procedure enables him immediately to verify the correctness of his answer or to learn the answer. Heretofore, many devices have been employed to test and instruct the student in the manner described. Some of these devices have incorporated the principles of programmed learning and have included various kinds of teaching machines. These systems have often involved the use of additional equipment, often cumbersome, inconvenient and sometimes impractical to use efficiently.

It is of importance in assisting the student in his learning process to permit verification of the student's answer to be immediately and easily determinable. If the correct answer is immediately and easily available, the rate of learning is improved. In addition, the fact that an answer is readily available is an important inducement to the student to continue with the perfection of the learning process and tends to minimize an early discouragement on the part of the student which may come about from too great an involvement with the mechanics of the device being used as the educational aid. Moreover, a device embodying the invention could also be employed as a competitive game whereby the relative knowledge of individuals may be scored and compared with a known standard of perfection.

Accordingly, it is an object of this invention to provide a device for imparting information and knowledge to students.

It is a further object of this invention to provide a device that is simple, compact, portable and employed with ease and efficiency, which can assist in the disclosure of information or the verification of the answer to particular questions.

Another object of the invention is to provide an improved device for teaching, learning and amusement.

Still another object of the invention is to provide a device for presenting questions, statements, symbols, representations or other stimuli on an ordinary sheet of paper and making readily available the answers or other indicia representative of the answers to such stimuli.

The invention consists substantially of a single sheet of material such paper or the like, having a front face and a back face. On the front face, there is marked or printed certain indicia representative of a question or other like stimuli. On the back face of the same sheet, there is a marking or other indicia representative of the answer to the question or the response to the stimuli. Under ordinary conditions, when viewing the front face of the sheet, only the question or stimuli is visible, the material appearing on the back face not being visible through the sheet. However, the sheet selected is of such translucent character so that when the sheet is placed between the viewer and a light source the indicia representative of the answer, or the response to the stimulus, which appears on the back face of the sheet is also visible to a viewer from the front face.

The invention accordingly comprises the device embodying the features of construction, combination of elements and arrangement of parts, all as exemplified in the following detailed disclosure, and the scope of the invention will be indicated in the claims.

Reference should be had to the accompanying drawings in connection with the description, in which like numerals identify similar parts throughout, and in which drawings:

FIGURE 1 is a perspective view of a sheet of material having printed matter appearing on the front face;

FIGURE 2 is a perspective view of the back face of the sheet of material;

FIGURE 3 is a perspective view showing the sheet of material being held up to a light source;

FIGURE 4 shows a sheet of material in which the front face has printed thereon a question seeking a response;

FIGURE 5 shows a sheet of material in which the front face has printed thereon a multiple choice question; and FIGURE 6 shows a sheet of material in which the front face has printed thereon various indicia requiring matching.

In FIGURES 1, 2 and 3, the general principle employed in following the invention is illustrated. A sheet of material 10 such as paper, plastic or other such material on which writing could be placed, has two faces, a front face 11 and a back face 12. On the front face 11, there is printed some indicia such as a question or a statement 13 seeking a response. The word "question" as used in this description is intended to be very broad and implies an actual question or any other stimuli or statement to which there is normally a required, expected or desired response. Indicia indicating the correct response, however, is absent from the front face 11 of sheet 10 so that the viewer, when viewing the sheet 10 from the front face 11, is given an opportunity to furnish the proper response without reference to any outside source of information. On the back face 12 of the sheet 10 there is indicia which indicates or comprises the proper response. This indicia may be in the form of printed matter 14 in a location on back face 12 such that it does not overlap the printed matter 13 on front face 11. The printed matter 14 may comprise an actual word, statement, letter, numerals, symbol, arrow or whatever is required to indicate the proper response to the question posed on the front face 11.

In FIGURES 1, 2 and 3, the statement 13 tests the student's knowledge of the capital of the State of Illinois, giving the student an opportunity to select one of three choices. The printed matter 14 contains the correct answer "Springfield" printed on back face 12 in mirror image printing so that even when viewing back face 12 directly, it would be generally unintelligible to the casual viewer. This arises from the fact that in most instances the average person is unable to read mirror image printing without great difficulty. It is obvious that the correct answer in FIGURES 1, 2 and 3 could have been indicated also by other suitable means such as the letter "(b)" printed in mirror image printing on back face 12.

Sheet 10 is a relatively opaque material so that, under normal circumstances, when viewing sheet 10 from the front face 11, the printed matter 14 comprising the correct response to the statement 13 is not visible. However, when sheet 10 is held up to a light source, sheet 10 is sufficiently translucent so that printed matter 14 is visible to a viewer viewing the sheet 10 from the front face 11. The light source 20 provides sufficient back lighting to enhance the translucency of the sheet 10 thereby permitting the printed matter 14 to be visible from front face 11. Since the printed matter 14, if it consists of letters of the alphabet or numerals is printed in mirror image writing, viewed from front face 11 it will appear as normal intelligible script and the viewer will have no difficulty in ascertaining the correct response to the question posed on the front face 11.

Light source 20 may consist of any suitable or convenient back lighting means such as an electric light bulb, fluorescent lighting tubes, ordinary daylight or the like. If desired the indicia printed on the back face may be such that it is visible only when lighted by infrared or ultraviolet light.

FIGURE 4 shows the front face 21 of a single sheet of paper 22 having a question 23 printed thereon which seeks information in explanatory form. On the back face of sheet 22, the answer 24 is set forth in mirror image printing. Thus, to the ordinary person the answer would not be readily evident by merely glacing at the back face of the sheet 22. When sheet 22 is held up with its back face to the light (not shown) the correct answer 24 is visible to the viewer looking at sheet 22 from the front face 21.

In FIGURE 5 there is shown another means embodying the invention. The front face 31 of sheet 32 contains a question 33 and several possible answers 34, only one of which is correct. This is ordinarily referred to as a multiple choice question. The indicia designating the correct response is printed on the back face of the sheet merely by the means of a symbol such as an arrow 35 pointing to the correct choice. The arrow 35 is shown dotted in FIGURE 5 because it is printed only on the back face of sheet 32 and is not visible to the viewer of the front face 31 unless sheet 32 is back lighted. The relative translucency of the sheet in combination with the back lighting and the printing of the arrow 35 on the back face permits the arrow to be observed from the front face 31.

In FIGURE 6 there is illustrated a matching question where a first group of statements are made and a second group of statements or names associated with individual ones of the first group of statements are set forth. The proper response requires the viewer to match the particular names or statements of the second group with the particular statements of the first group. Both the first group of statements 41 lettered (a), (b), (c), (d) and (e) and the second group of statements 42 numbered (1), (2), (3), (4) and (5) are printed on the front face 43 of sheet 44. On the back face of sheet 44, adjacent the appropriate statement in the first group 41 there is printed in mirror image printing, the numeral 45 that corresponds to the numeral adjacent the correct answer in the second group of names 42. The numerals 45 printed on the back face of sheet 44 are not visible to the viewer of the front face 43 unless sheet 44 is back lighted.

It is also evident from the foregoing that a single sheet may have a plurality of questions on the front face thereof and a plurality of indicia on the back face thereof providing appropriate answers to each question. The indicia comprising the stimulus may be of any form such as for example diagrams with parts missing, incomplete formulae and the like. The appropriate indicia indicating the response would be printed on the back face of the sheet so that it would be readable from the front face only when the sheet is backlighted.

Another important use for the invention is the assistance such a device would provide in order to enable an actor to learn a role in a play. If desired, the entire play may be printed on a series of sheets which have blank spaces on the front face thereof wherever the particular role which the actor is required to learn would ordinarily appear. On the back face of each sheet, in the location corresponding to the blank space on the front face, the script comprising the role required to be learned is printed in mirror image writing. Thus, the actor would have a series of sheets on which the entire play is printed and he would be able to test himself efficiently and easily to determine whether he is fully familiar with his particular role. If the actor is not certain of a particular response to a cue, he merely holds the sheet up to the light and he quickly sees what the proper response should be.

In like manner, the invention may be used as an educational aid in the process of learning a foreign language. On the front face of a sheet a statement in English is printed. On the back face of the sheet, the same statement is printed in mirror image writing in the foreign language desired to be learned. The student may easily test himself by viewing only the front face in the absence of any back lighting source for the sheet, and then verify the correct foreign translation by holding the sheet up to a lighting source. Thus, in accordance with the invention, the student is able to see the correct translation directly below the statement in English.

It is also apparent from the foregoing that the type of stock used for a paper comprising the sheet would depend in large part on the printing used on the back face or the particular purpose that the educational device is designed to meet. In general the choice of type face employed on the back face should be a bolder type face or one which may be easily read. With the concept of the invention in mind, selection of a particular paper stock to accomplish the purposes of the invention is also a matter of choice, readily ascertainable to anyone skilled in the art.

For some purposes, it may be preferable and desirable to use as the sheet material a coated stock paper because such paper has the characteristic of being more translucent when it is back lighted. This increases the viewer's ability to see the indicia on the back face when viewing the sheet from the front face under back lighting conditions. This would permit the use of heavier stock paper which is more opaque when it is not back lighted. I have found that a coated paper having a stock ranging between 50 and 70 pounds provides a suitable sheet on which to print the question on the front face and the answer in mirror image printing on the back face.

In operation, the educational device is simple, portable and relatively easy to store. It is efficient to use and involves no waste motion such as that which may be involved in turning over sheets to look at the back face thereof. The invention incorporates the basic principles of programmed learning which include active learning, immediate knowledge of results and self pacing. The student can test himself constantly at all times in varying situations by merely looking at the sheet and attempting to answer the question which is posed. If he finds he does not know the answer, a slight movement holding the sheet up to a light source provides him with the answer.

Employing the principles of the invention, any particular design may be selected which is appropriate to the desired use. Although the sheet has generally been shown to be paper, it could be other material which has the same translucent quality when held up to a light. The light source may be a specific light source or any of the normal illuminating sources that are available including daylight. The indicia representing the correct response appearing on the back face of the sheet may be printed in normal type or various means may be employed to make such printing more difficult to see from the front face unless the sheet is back lighted. For example, the printing on the back face may be of a less intense type, or if desired, the printing on the back face may be further coated with a white or a light colored ink which has the effect of masking the black print when viewed from the back face. However, when the back face is held up to the light, the black ink on the back face appears to be visible when viewed from the front face.

The invention may be used to provide mental stimuli of any written kind which calls for the operation of the mind and the proper response to that stimuli may be readily ascertainable as heretofore described.

It will thus be seen that the objects set forth above, among those made apparent from the preceding description, are efficiently attained, and, since certain changes may be made in carrying out the above invention set forth without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A portable educational device comprising a translucent sheet of coated paper, said sheet having a front face and a back face, said front face having first indicia marked thereon, said back face having second indicia marked thereon in a mirror image arrangement, said first and second indicia cooperating to disclose information, the translucency of said sheet being such that said second indicia is visible through said front face only when said sheet is held before a light source and a masking coating of light-colored ink on said back face masking said second indicia.

2. A portable educational device comprising a rectangular, translucent sheet of coated paper having a stock rating of between 50 and 70 pounds, said sheet having a front face and a back face, said front face having a pattern of indicia representing questions printed thereon, said printed indicia extending transversely across said front sheet from a location adjacent one transverse margin of the sheet in the direction of the other transverse margin, said back face having response indicia printed thereon in a mirror image arrangement, said response indicia being printed on said back face in a non-overlapping relation to the printed indicia on said front face, the translucency of said sheet being such that said printed response indicia is visible through said front face only when said sheet is held before a light source, and a masking coating of light-colored ink on said back face masking said printed response indicia.

References Cited

UNITED STATES PATENTS

| | | | |
|---|---|---|---|
| 2,092,577 | 9/1937 | Hornung | 35—9 |
| 2,178,906 | 11/1939 | Haumerson | 35—9 |
| 2,395,804 | 3/1946 | De Gruchy | 283—6 |
| 3,068,010 | 12/1962 | Hagopian | 35—9 |
| 3,103,750 | 9/1963 | Werner | 35—9 |

EUGENE R. CAPOZIO, *Primary Examiner.*

S. M. BENDER, W. W. NIELSEN, *Assistant Examiners.*